United States Patent [19]
Weihrich et al.

[11] Patent Number: 5,797,677
[45] Date of Patent: Aug. 25, 1998

[54] SCREW-TYPE EXTRUDING MACHINE HAVING A SCREW ELEMENT DEFINING A GROOVE WITH AN EXPANSION REGION AT EACH END THEREOF

[75] Inventors: Gerhard Weihrich; Wolfgang Woerz, both of Illingen; Reinhard Wuttke, Stuttgart; Rainer Sauter, Remseck, all of Germany

[73] Assignee: Werner & Pfleiderer GmbH, Stuttgart, Germany

[21] Appl. No.: 750,709

[22] PCT Filed: Jun. 3, 1995

[86] PCT No.: PCT/DE95/00728

§ 371 Date: Dec. 17, 1997

§ 102(e) Date: Dec. 17, 1996

[87] PCT Pub. No.: WO95/35195

PCT Pub. Date: Dec. 28, 1995

[30] Foreign Application Priority Data

Jun. 20, 1994 [DE] Germany ............... 44 21 514.2

[51] Int. Cl.⁶ .................. B29B 7/48; B29B 7/58
[52] U.S. Cl. .................. 366/85; 366/331; 403/358; 425/192 R
[58] Field of Search ............... 366/69, 79, 83–85, 366/100, 318, 331; 425/183, 192 R, 204, 208, 209; 403/355, 356, 358, 359

[56] References Cited

U.S. PATENT DOCUMENTS

| | | | |
|---|---|---|---|
| 1,458,820 | 6/1923 | Griffith | 403/358 |
| 2,038,554 | 4/1936 | Edgar | 403/359 |
| 2,588,064 | 3/1952 | Webb | 403/358 |
| 3,254,367 | 6/1966 | Erdmenger | 366/85 |
| 3,305,894 | 2/1967 | Boden et al. | 366/85 |
| 3,998,318 | 12/1976 | McAlarney | |
| 4,373,831 | 2/1983 | Crawford | 403/358 X |
| 4,875,847 | 10/1989 | Wenger et al. | 425/208 X |
| 5,048,971 | 9/1991 | Wall et al. | 366/85 |

FOREIGN PATENT DOCUMENTS

| | | |
|---|---|---|
| 0399869 | 11/1990 | European Pat. Off. |
| 0426619 | 5/1991 | European Pat. Off. |
| 1264883 | 3/1968 | Germany |
| 1502337 | 3/1969 | Germany |
| 4206219 | 9/1993 | Germany |

*Primary Examiner*—Charles E. Cooley
*Attorney, Agent, or Firm*—Spencer & Frank

[57] ABSTRACT

A screw-type extruding machine includes a housing; a driveable shaft disposed inside the housing and including a rotational moment transfer element; and at least one screw element. The screw element has two ends and defines a longitudinal groove therein for receiving the rotational moment transfer element of the shaft, the shaft thereby transferring its rotational moment to the screw element. The groove is configured such that it defines two expansion regions, each expansion region having an axial extent, the groove having side surfaces which diverge with respect to a longitudinal axis of the groove along the axial extent of each expansion region in a direction toward a corresponding one of the two ends of the screw elements, a width of the groove thereby increasing in a direction toward its two ends along each expansion region.

8 Claims, 3 Drawing Sheets

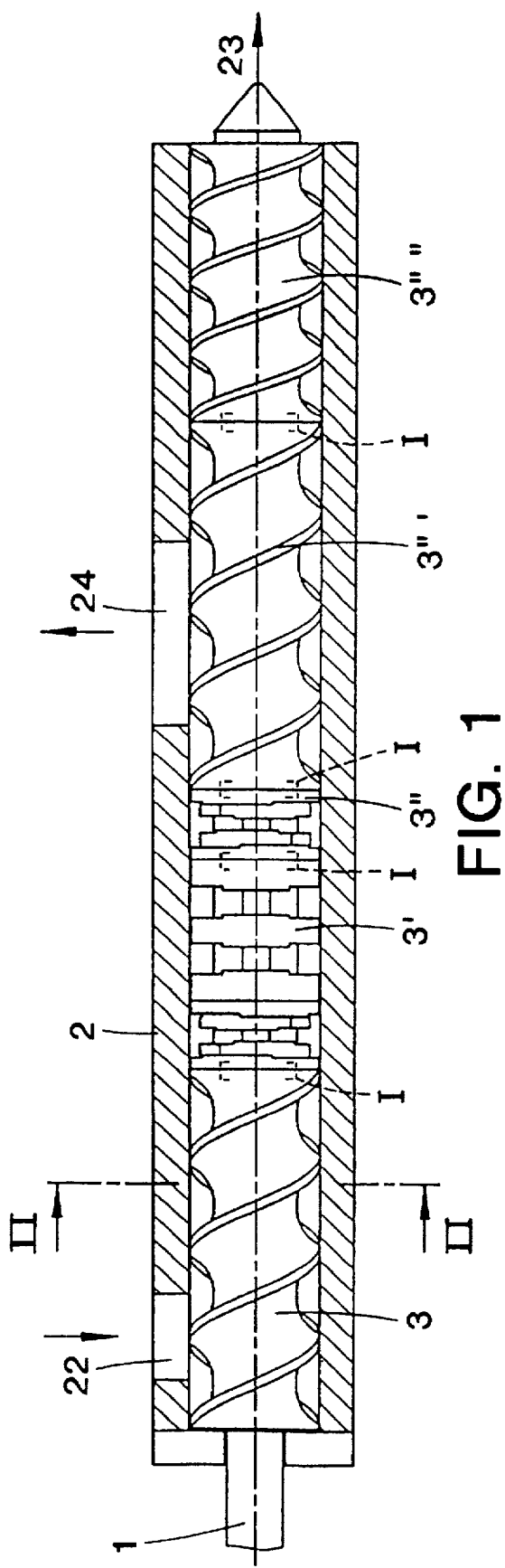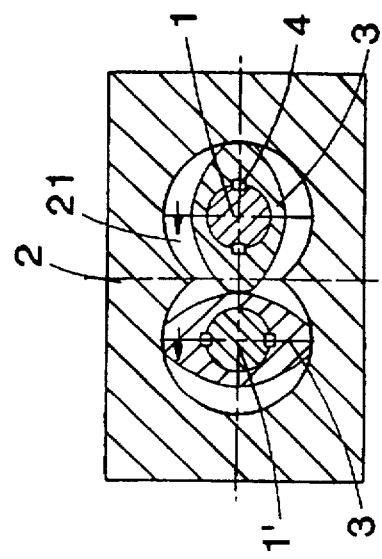
FIG. 1
FIG. 2

SCREW-TYPE EXTRUDING MACHINE HAVING A SCREW ELEMENT DEFINING A GROOVE WITH AN EXPANSION REGION AT EACH END THEREOF

FIELD OF THE INVENTION

The invention relates to a screw-type extruding machine for processing materials, in particular for the processing of plastics, having at least one drivable shaft that is arranged inside a housing, onto which wear-resistant screw-type elements can be inserted in an optional sequence.

BACKGROUND OF THE INVENTION

Nowadays, screw shafts for screw-type extruding machines are designed in accordance with the prior art in a modular fashion. For that, screw-type and kneading elements for the most varied functions such as conveying, plastifying, mixing and cutting, homogenizing, degasing and building up pressure are fitted in a freely selectable sequence onto a shaft. An interlocking connection secures the screw elements against twisting and permits the transfer of the rotational moment from the rotating shaft to the screw element.

The different process functions require that the work material be adapted to these functions, e.g. that it be wear-resistant, anticorrosive or a combination of both. Conditional upon the respective connecting systems for the shaft/hub (feather key, six-spline, multi-spline or involute tooth system (e.g. DE-OS 15 02 337)) stress concentrations tend to occur at the notches or grooves of those connecting systems. In particular with through-hardened elements made of wear-resistant materials (tool steels, cold-working steels, rapid-machining steels) these stress concentrations can lead to a breaking of the element, which can result in considerable damage in a screw-type extruding machine.

The use of spring-actuated keys as transfer elements for the rotational moment between shaft and screw elements to increase the load capacity of the shaft is known from DE 42 06 219 A1.

Apart from the fact that this measure can be used only when using feather keys as transfer elements for the rotational moment and a groove as a longitudinal recess (and not when using multi-spline, involuted tooth system etc.), it is not possible to purposely reduce the stress peaks (hub edge stresses) that occur at the screw elements in the above arrangement because the deformation of the feather key always occurs along its total length.

In order to reduce the danger of breaking, screw elements used primarily in practical operations are made from a composite material comprising a ductile core material into which the profile of the composite system is inserted, and a jacket material that serves as a wear and/or corrosion resistant material. This composite material is typically manufactured with methods such as those used for manufacturing melt-metallurgical cast materials, soldered composites or hot-isostatically produced PM composites.

The manufacture of these composite materials is very cost-intensive and frequently no longer economical for a wear-resistant part.

SUMMARY OF THE INVENTION

The object upon which the invention is based involves designing the connection between the shaft or shafts of a screw-type extruding machine and the insertable screw elements in such a way that the risk of breakage during the transfer of the rotational moment, particularly for screw elements made of through-hardened material, is reduced considerably.

The above object is achieved by providing a screw-type extruding machine which includes a housing; a drivable shaft disposed inside the housing and including a rotational moment transfer element; and at least one screw element. The screw element has two ends and defines a longitudinal groove therein for receiving the rotational moment transfer element of the shaft, the shaft thereby transferring its rotational moment to the screw element. The groove is configured such that it defines two expansion regions, each expansion region having an axial extent, the groove having side surfaces which diverge with respect to a longitudinal axis of the groove along the axial extent of each expansion region in a direction toward a corresponding one of the two ends of the screw element, a width of the groove thereby increasing in a direction toward its two ends along each expansion region. Based on the above arrangement, the point-shaped stresses on the fronts (hub edge) of the screw elements are avoided during the transfer of the rotational moment because the shaft deformation due to the rotational moment of the shaft is distributed over a relatively long contact surface by the V-shaped expansion of the side surfaces of the groove.

According to one embodiment of the invention, the side surfaces of the groove diverge with respect to one another in a direction away from the base of the groove.

In modifications of the invention, an optimizing of the connection is provided for each shaft diameter. Based on these conditions, the optimum side expansion can be determined for each application. Thus, according to one embodiment of the invention, a difference 2x between the width of the groove between its expansion regions and the width of the groove at each of its two ends is such that x is less than or equal to 0.02 D. Moreover, the axial extent of the expansion regions y may be less than or equal to L/2 or D, where L is a length of the screw element and D is the diameter of the shaft.

The extruding machine of the present invention may comprise a plurality of wear-resistant screw elements adapted to be fitted over the shaft in an optional sequence such that they interlock with one another.

The preferred application according to the invention is for screw elements which are made of a through-hardened metallic or non-metallic material and thus have a very high breaking sensitivity.

BRIEF DESCRIPTION OF THE DRAWINGS

Other advantages of the invention will become apparent in the following description and in the drawings. Shown are in:

FIG. 1 A longitudinal cross-sectional view through a housing for a uniform torsion double-lead screw-type extruding machine as seen from the side;

FIG. 2 A cross-sectional view along line II—II of FIG. 1;

DETAILED DESCRIPTION OF THE INVENTION

Figure 5:
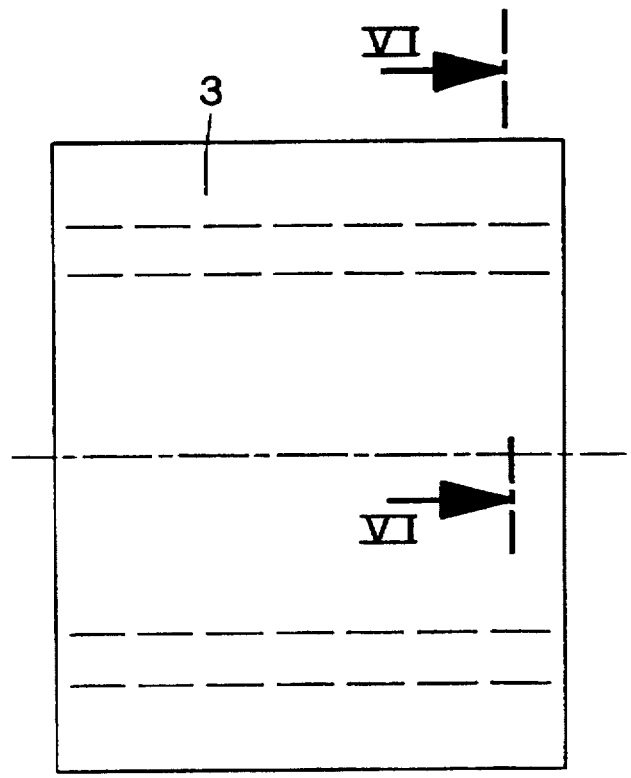
FIG. 5 A side elevational view of the screw element of FIG. 4.

As seen in FIGS. 1, 2 and 5, in housing 2 of a screw-type extruding machine, a continuous, spectacle-shaped borehole 21 is arranged for receiving the shafts 1, 1' fitted with screw elements 3. The shafts 1, 1' rotate in the same direction and are operated via a motor and gears that are not shown.

Figure 3:
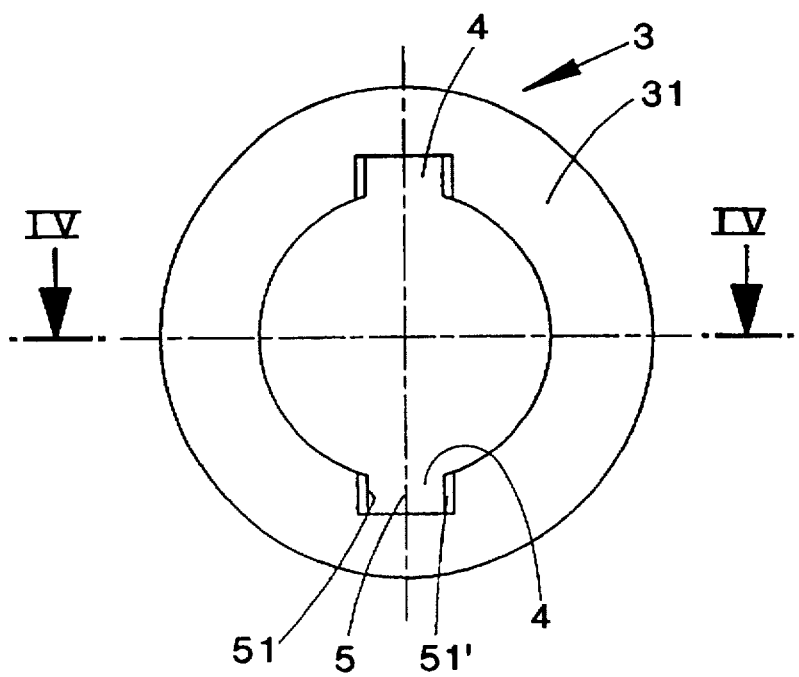
FIG. 3 A schematic front elevational view of a screw element.

As seen in FIG. 3, feather keys 4 are shown as rotational movement transfer elements for the rotational moment and grooves 5 as longitudinal recesses in the screw elements 3. In place of the shaft/hub connection shown here, it is of course possible to provide all other known connection elements used for screw elements, such as six-key, multi-spline, serrated and/or involute tooth systems with the V-shaped expansion according to the invention.

As seen in FIG. 1, in dependence on the material to be processed, screw elements 3–3"" (kneading, screw-type, conveying, pressure build-up element and others) are fitted onto the shafts 1, 1' in a freely selectable sequence. Screw elements 3–3"" are interlocked with one another at interlocking regions "I" as shown schematically in FIG. 1. The number 22 stands for the feed, 24 for the degasing opening and 23 for the discharge of the screw-type extruding machine.

Figure 4:
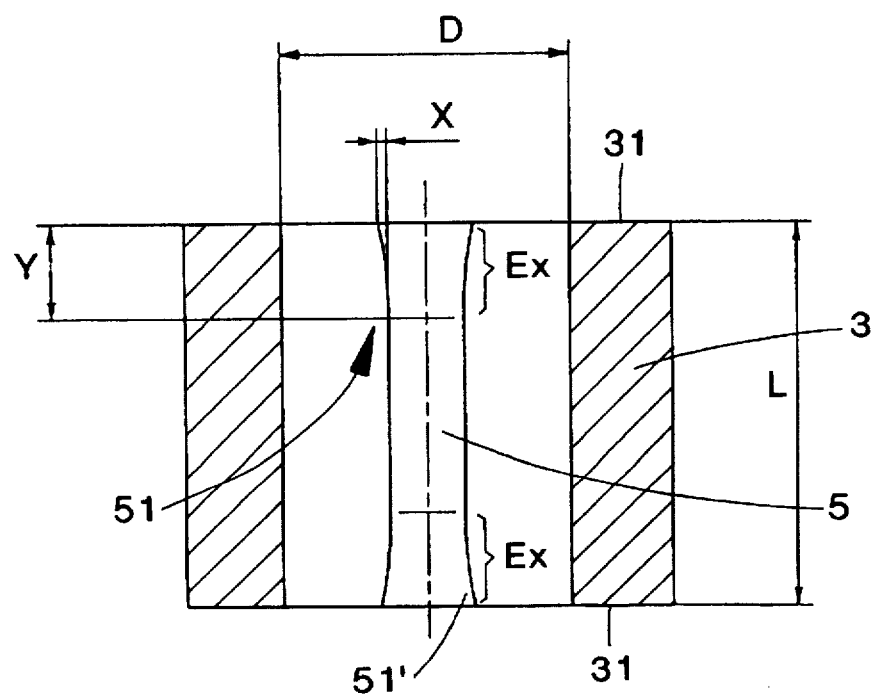
FIG. 4 A cross-sectional view along line IV—IV in FIG. 3 showing an expanding groove according to the invention.
Figure 6:
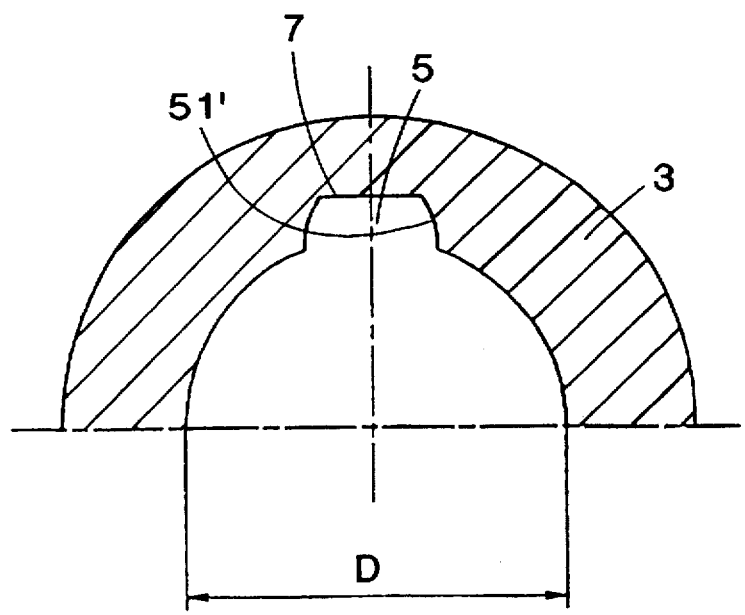
FIG. 6 A cross-sectional view along line VI-VI in FIG. 5 showing a more detailed view of the groove.

As seen in FIGS. 4 and 6, in order to reduce edge stresses, sides 51 of groove 5 are expanded along expansion regions Ex in a V shape toward the ends 31 of the screw element. This expanded side surface 51' is shaped as a double bent spatial surface, that is, as a surface which is bent in the longitudinal direction on both sides of the longitudinal axis, as shown in FIG. 4. Surface 51' is further calculated anew for each application as a function of the diameter of shafts 1, 1', which diameter is in turn dependent on the rotational movement intended for the shaft.

The axial extent y of side surface 51' in screw element 3 is such that at least one of the following applies:

$$y \leq L/2 \text{ and } y \leq D$$

where L is the length of screw element 3 in the axial direction, and D is the diameter of shaft 1.

Moreover, the difference 2x between the width of groove 5 at ends 31 and the width of the groove at a non-expanded region of the groove between the two expansion regions is such that:

$$x \leq 0.02 \, D.$$

As seen more particularly in FIG. 6, groove 5 has a base 7, side surfaces 51' diverging with respect to one another in a direction away from the base.

The preferred area of application for the invention is for wear-resistant screw elements, which consist only of a through-hardened work material and are very sensitive to breaking as a result of stress. The working materials can be hard or hardenable metallic work materials or hard, nonmetallic work materials, for example ceramics, zirconium oxide, aluminum oxide or the like. With the invention, the risk of breakage for these sensitive screw elements can be lowered by more than 50% as compared to the traditional shaft/hub connections.

What is claimed is:

1. A screw-type extruding machine comprising:
   a housing;
   a driveable shaft disposed inside the housing and including a rotational moment transfer element; and
   at least one screw element having two ends and defining a longitudinal groove therein for receiving the rotational moment transfer element of the shaft, the shaft thereby transferring its rotational moment to the at least one screw element, the groove being configured such that it defines two expansion regions, each expansion region having an axial extent y, the groove having side surfaces which diverge with respect to a longitudinal axis of the groove along the axial extent of each expansion region in a direction toward a corresponding one of the two ends of the at least one screw element, a width of the groove thereby increasing in a direction toward its two ends along each expansion region.

2. The extruding machine according to claim 1, wherein the groove has a base, and wherein the side surfaces diverge with respect to one another in a direction away from the base.

3. The extruding machine according to claim 1, wherein:
   the shaft has a diameter D; and
   a difference 2x between the width of the groove between the expansion regions thereof and the width of the groove at each of its two ends is such that x is less than or equal to 0.02 D.

4. The extruding machine according to claim 1, wherein y is less than or equal to at least one of L/2 and D, where L is a length of the at least one screw element and D is a diameter of the shaft.

5. The extruding machine according to claim 1, wherein the rotational moment transfer element is a feather key.

6. The extruding machine according to claim 1, wherein the at least one screw element comprises a plurality of wear-resistant screw elements adapted to be fitted over the shaft in an optional sequence such that they interlock with one another.

7. The extruding machine according to claim 1, wherein the at least one screw element is wear resistant and is made of a through-hardened material.

8. The extruding machine according to claim 7, wherein the material is metallic.

* * * * *